S. O. RICHARDSON, Jr.
POT FURNACE.
APPLICATION FILED APR. 14, 1910.
1,021,798.
Patented Apr. 2, 1912.
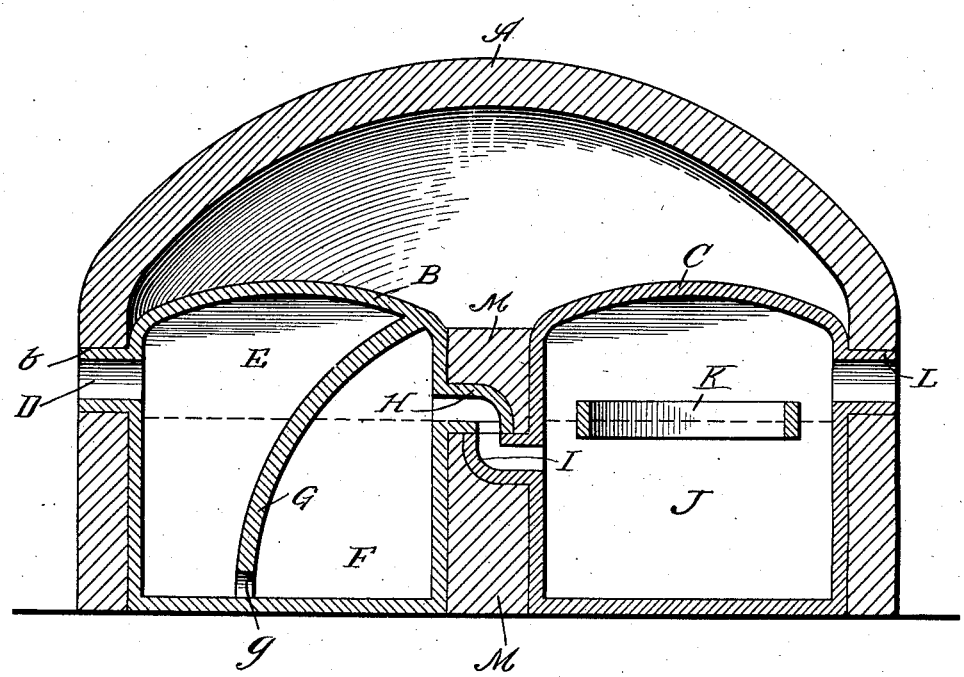

UNITED STATES PATENT OFFICE.

SOLON O. RICHARDSON, JR., OF TOLEDO, OHIO.

POT-FURNACE.

1,021,798.  Specification of Letters Patent.  Patented Apr. 2, 1912.

Application filed April 14, 1910. Serial No. 555,432.

*To all whom it may concern:*

Be it known that I, SOLON O. RICHARDSON, Jr., a citizen of the United States, residing at Toledo, in the county of Lucas and State of Ohio, have invented certain new and useful Improvements in Pot-Furnaces, of which the following is a specification.

My invention relates to new and useful improvements in furnaces for the production of pot glass or crucible glass, such as lead glass and other high grade glasses of that character, in which the best results are obtained by protecting the batch and the metal at all times from direct contact with the reducing flames or gases used in the furnace.

A particular object of my invention is to provide such a furnace in which there shall be a continuous flow of metal to the working chamber, or a substantially continuous flow, by which I mean that, as the metal is worked out from time to time from the working chamber, fresh materials are correspondingly supplied at relatively short intervals to the feed opening of the furnace. While this structure has the advantage of providing a continuous production of pot glass in pots which are kept at substantially the same temperature all the time, and thus do not require frequent replacement, regardless of whether the glass is worked by hand or by machine, it is particularly useful when gathering machines are used, because, for the best results with such machines, there must be maintained a substantially uniform level of metal in the working chamber at all times, thus requiring a constant inflow or replenishment of the metal. These and such other objects as may hereafter appear are accomplished by my invention, a preferred embodiment of which is shown in the accompanying drawing, which shows a longitudinal, vertical section through a glass furnace fitted with a convenient embodiment of my invention.

A indicates a glass furnace, to the interior of which the required heat is supplied in any desired manner, as, for example, by burning gases in the usual and familiar way. Mounted within this furnace are two pots B and C, the pot B having a neck $b$ which is bricked into the receiving end of the furnace wall and provides the receiving or feed opening D which may be closed from time to time in any usual and convenient manner. The pot B is divided into a receiving or reducing chamber and a discharge or plane chamber, in the first of which, E, such reduction as may be required takes place, the resulting metal flowing through the opening $g$ in the partition G, communicating with the chamber F. Ordinarily the metal will be partly planed in the chamber E and the planing will be completed in the chamber F. The unfused ingredients of the batch floating on the metal in chamber E are excluded from chamber F by the partition G. Leading from the chamber F is a spout H, which is preferably arranged with its discharge opening in a plane just below the bottom of the feed opening D, so that only the best of the metal in chamber F will overflow through the spout H. The spout H communicates with the spout I leading into the pot C, which provides the working chamber of the apparatus. These spouts are preferably surrounded, inclosed and supported by brick work M, made of refractory brick, such as silica brick, for two purposes, first, because these pots are ordinarily made of unbaked clay, a material of such quality that laterally projecting parts will readily break down under the weight of metal, and, therefore, are preferably supported as shown, and for the further reason that by inclosing these spouts, the reducing gases and products of combustion are shut out from contact with the metal as it flows from pot B to pot C, thereby providing a substantially continuous closed pot or retort. The brick need not, nor will it preferably, hermetically seal the joint between the spouts H and I, there being obviously an advantage in allowing the escape of gases from the pots at this point. It should, however, sufficiently surround and inclose the spouts so as to prevent the flame or products of combustion from entering the pots. From pot C the metal is worked through the working opening in the neck L, which is bricked into the working side of the furnace, A. As an incident, the ring K, of refractory material, will ordinarily float upon the metal in the working chamber J of pot C as a further precaution against any loose particles of unfused material which might float into the working chamber.

With this construction it will be seen that, in addition to the other advantages noted, if it becomes necessary to remove either of the pots, the face brick of the furnace may be torn down and the pot removed and replaced by a new pot in the usual familiar manner, without disturbing the other pot.

I claim:

1. A continuous pot furnace, comprising the combination with the furnace, of means for supplying a reducing temperature to the interior thereof, a receiving pot mounted in the interior of said furnace, a working pot separate therefrom mounted in the interior of said furnace, said receiving pot being provided with a feed opening communicating with the exterior of said furnace and with a metal discharge opening communicating with said working pot, said working pot being provided with a metal receiving opening communicating with said receiving pot and with a working opening communicating with the exterior of the furnace, said receiving pot being divided by a partition into a reducing chamber and a planing chamber and being provided with a metal conduit establishing communication between said chambers, said pots and the communication between them being closed against the entrance of products of combustion from the interior of said furnace.

2. The combination with a glass furnace provided with a feed opening and a working opening, of a receiving and reducing pot mounted therein and provided with a feed opening fitted to the feed opening of the furnace, an internal partition provided with a metal passage below the metal level, and a discharge spout leading from a point in the interior of said pot on the side of said partition opposite to said feed opening, a working pot provided with a working opening fitted to the working opening of said furnace, and a feed spout leading to the interior of said pot, means for mechanically supporting said feed spout in a position communicating with the discharge spout of said first-named pot, said feed spout being arranged to support said discharge spout, and means for closing communication between said spouts and the interior of the furnace so as to exclude the gases within the furnace.

3. The combination with a glass furnace provided with a feed opening and a working opening, of a receiving and reducing pot mounted therein and provided with a feed opening fitted to the feed opening of the furnace, an internal partition provided with a metal passage below the metal level, and a discharge spout leading from a point in the interior of said pot on the side of said partition opposite to said feed opening, a working pot provided with a working opening fitted to the working opening of said furnace, and a feed spout leading to the interior of said pot, means for mechanically supporting said feed spout in a position communicating with the discharge spout of said first-named pot, said feed spout being arranged to support said discharge spout, and means for closing communication between said spouts and the interior of the furnace so as to exclude the gases within the furnace, said pots being so arranged with relation to each other that either pot may be removed from the furnace without disturbing the other pot.

4. The combination with a glass furnace, of means within the furnace constituting a reducing chamber, a planing chamber and a working chamber, which chambers are successively in communication with each other and closed against the entrance of products of combustion from the interior of the furnace; the reducing chamber being provided with a feed opening and the working chamber with a working opening, which openings are on opposite sides of said furnace.

5. The combination with a glass furnace, of means within said furnace constituting a reducing chamber, a planing chamber and a working chamber, which chambers are closed against the entrance of products of combustion from the interior of the furnace; the planing chamber being in communication with the chambers on either side of it at places respectively near the bottom of the communicating chambers and near the metal level.

6. The combination with a glass furnace, of means within the furnace constituting a reducing chamber, a planing chamber and a working chamber, said chambers being closed against the entrance of products of combustion from the interior of the furnace; the planing chamber being in communication with the reducing chamber at a place near the bottom of said chambers, and with the working chamber at a place near the metal level.

7. The combination with a glass furnace, of a closed glass pot provided with a feed opening and with an interior partition having an opening in the bottom thereof, which partition divides said pot into a reducing chamber and a planing chamber; and a second closed pot providing a working chamber; said pots provided with spouts at substantially the metal level, by means of which the pots are put into communication one with the other and the second pot having a working opening.

8. The combination with a glass furnace, of a closed glass pot provided with an interior partition having an opening in the bottom thereof, which partition divides said pot into a reducing chamber and a planing chamber; a second closed pot providing a working chamber; said pots provided with spouts at substantially the metal level, by means of which the pots are put into communication one with the other, the second pot being provided with a working opening and a brick work partition which supports and incloses said spouts, in the manner and for the purpose described.

SOLON O. RICHARDSON, Jr.

Witnesses:
JOHN H. WRIGHT,
H. A. PEITER.

It is hereby certified that in Letters Patent No. 1,021,798, granted April 2, 1912, upon the application of Solon O. Richardson, Jr., of Toledo, Ohio, for an improvement in "Pot-Furnaces," errors appear in the printed specification requiring correction as follows: Page 1, line 59, for the word "plane" read *plaining;* page 1, line 64, for the word "planed" read *plained;* page 1, line 65, page 2, lines 29, 84, 95, 99, 106, 110, 120, and page 3, line 1, for the word "planing" read *plaining;* and that the said Letters Patent should be read with these corrections therein that the same may conform to the record of the case in the Patent Office.

Signed and sealed this 11th day of June, A. D., 1912.

[SEAL.]

C. C. BILLINGS,
*Acting Commissioner of Patents.*